United States Patent
Yoo et al.

(10) Patent No.: US 10,435,802 B2
(45) Date of Patent: Oct. 8, 2019

(54) CATHODE CATALYST FOR WATER ELECTROLYSIS DEVICES AND METHOD OF PREPARING THE SAME

(71) Applicant: KOREA INSTITUTE OF SCIENCE AND TECHNOLOGY, Seoul (KR)

(72) Inventors: Sung Jong Yoo, Seoul (KR); Injoon Jang, Seoul (KR); So Young Lee, Seoul (KR); Jin Young Kim, Seoul (KR); Jong Hyun Jang, Seoul (KR); Hyoung-Juhn Kim, Seoul (KR); Jonghee Han, Seoul (KR); Hyun Seo Park, Seoul (KR)

(73) Assignee: Korea Institute of Science and Technology, Seoul (KR)

(*) Notice: Subject to any disclaimer, the term of this patent is extended or adjusted under 35 U.S.C. 154(b) by 54 days.

(21) Appl. No.: 15/910,270

(22) Filed: Mar. 2, 2018

(65) Prior Publication Data

US 2018/0258544 A1 Sep. 13, 2018

(30) Foreign Application Priority Data

Mar. 7, 2017 (KR) ........................ 10-2017-0029025

(51) Int. Cl.
*B01J 35/00* (2006.01)
*B01J 23/28* (2006.01)
*B01J 23/72* (2006.01)
*B01J 23/74* (2006.01)
*B01J 23/881* (2006.01)
(Continued)

(52) U.S. Cl.
CPC ............ *C25B 11/0447* (2013.01); *C25B 1/04* (2013.01); *B01J 35/0033* (2013.01); *Y02E 60/366* (2013.01)

(58) Field of Classification Search
CPC ........ B01J 35/00; B01J 27/1802; B01J 23/28; B01J 23/72; B01J 23/74; B01J 23/881; B01J 23/882; B01J 23/883; B01J 23/885; B01J 35/0033; B01J 37/08; B01J 37/34; Y02E 60/366; C25B 11/0447; C25B 1/04
USPC .......... 502/101, 211, 213; 75/245, 246, 343, 75/349, 627, 629; 419/31, 32, 45, 54, 57; 429/527, 528
See application file for complete search history.

(56) References Cited

U.S. PATENT DOCUMENTS 3,356,536 A * 12/1967 Seim ...................... H01M 4/90
420/456
3,364,075 A * 1/1968 Murdock ............. B01J 27/1853
502/101

(Continued)

FOREIGN PATENT DOCUMENTS

KR 10-2009-0028019 A 3/2009

OTHER PUBLICATIONS

Eric J. Popczun et al., "Nanostructured Nickel Phosphide as an Electrocatalyst for the Hydrogen Evolution Reaction", Journal of the American Chemical Society, 2013, pp. 9267-9270, vol. 135.

(Continued)

*Primary Examiner* — Patricia L. Hailey
(74) *Attorney, Agent, or Firm* — Rabin & Berdo, P.C.

(57) ABSTRACT

Provided are a cathode catalyst for water electrolysis devices and a method for preparing the same. More specifically, provided are a cathode catalyst for water electrolysis devices that exhibits both high activity and high electrical conductivity, compared to conventional transition metal phosphide catalysts, and a method for preparing the same.

12 Claims, 6 Drawing Sheets

(51) Int. Cl.
*B01J 23/882* (2006.01)
*B01J 23/883* (2006.01)
*B01J 23/885* (2006.01)
*B01J 37/08* (2006.01)
*B01J 37/34* (2006.01)
*C25B 11/04* (2006.01)
*C25B 1/04* (2006.01)

(56) References Cited

U.S. PATENT DOCUMENTS

| | | | | |
|---|---|---|---|---|
| 3,411,953 A | * | 11/1968 | Larson | H01M 4/90 |
| | | | | 420/441 |
| 3,514,340 A | * | 5/1970 | Larson | H01M 4/90 |
| | | | | 427/115 |
| 10,050,271 B2 | * | 8/2018 | Barker | C01B 25/37 |
| 2012/0208693 A1 | * | 8/2012 | Zhang | H01M 4/8605 |
| | | | | 502/101 |

OTHER PUBLICATIONS

Guigang Zhang et al., "Surface Modification of Carbon Nitride Polymers by Core-Shell Nickel/Nickel Oxide Cocatalysts for Hydrogen Evolution Photocatalysis", CHEMCATCHEM, 2015, pp. 2864-2870, vol. 7.

Xin-Yao Yu et al., "Carbon coated porous nickel phoshides nanoplates for highly efficient oxygen evolution reaction", Energy Enrivon. Sci., 2016, pp. 1246-1250, vol. 9.

* cited by examiner

NiP (2P)

NiP (P + P$_{up}$)

CATHODE CATALYST FOR WATER ELECTROLYSIS DEVICES AND METHOD OF PREPARING THE SAME

CROSS-REFERENCE TO RELATED APPLICATIONS

This application claims priority under 35 U.S.C. § 119 to Korean Patent Application No. 10-2017-0029025 filed on Mar. 7, 2017 in the Korean Intellectual Property Office, the disclosure of which is incorporated herein by reference in its entirety.

BACKGROUND OF THE INVENTION

Field of the Invention

The present invention relates to a cathode (reduction electrode) catalyst for water electrolysis devices that can promote production of hydrogen during decomposition of water and a method for preparing the same.

Description of the Related Art

Hydrogen has received much attention as a next-generation energy source that is clear and does not contain carbon. Hydrogen has been mainly produced by steam reforming to date. However, this production method still involves use of non-environmentally-friendly fuel cells, thus being contradictory. Accordingly, a great deal of research has been made on alternative production technologies to produce hydrogen in an environmentally-friendly manner. In particular, the highest potential method is to produce highly pure hydrogen by water electrolysis.

Meanwhile, since electrodes (made of catalyst) used to reduce energy required for water electrolysis are very expensive, research has been made on development of cheap materials alternative to these electrodes. As a result of research to replace costly catalysts by inexpensive materials, many sulfide or carbide catalysts based on transition metals (nickel, molybdenum, iron and cobalt) have been reported. However, the electrolysis activity of catalysts is lower than that of costly precious metals, in particular, is much lower than that of platinum that has the highest activity, among metals used for hydrogen generation electrodes.

Recently, transition metal phosphide catalysts have attracted much attention as hydrogen generation catalysts since 2013 due to high activity and chemical stability.

Catalysts used for electrolysis reaction are the most suitable when they secure both high activity and high electrical conductivity to reaction. However, the activity to hydrogen generation reaction that transition metal phosphide catalysts have greatly depends on the content of phosphorous in the transition metal. Activity to hydrogen generation reaction of most transition metal phosphide catalysts increases, as phosphorous content increases. However, disadvantageously, electrical conductivity of these catalysts greatly decreases, as phosphorous content increases. As such, reactivity and electrical conductivity counteract each other depending on phosphorous content. For this reason, with conventional methods, it is difficult to prepare catalysts that satisfy both properties.

Accordingly, there is a need for development of catalysts that have high activity to hydrogen generation reaction while maintaining high electrical conductivity.

PRIOR ART DOCUMENT

Patent Document

KR 10-2009-0028019 A

Non-Patent Document

1) Popczun, Eric J. et al.; "Nanostructured Nickel Phosphide as an Electrocatalyst for the Hydrogen Evolution Reaction"; J. Am. Chem. Soc., v. 135 no. 25, 2013, p. 9267-9270

SUMMARY OF THE INVENTION

Therefore, the present invention has been made in view of the above problems, and it is one object of the present invention to provide a cathode catalyst for water electrolysis devices with high activity and electrical conductivity.

It is another object of the present invention to provide a method for preparing a cathode catalyst for water electrolysis devices.

In accordance with the present invention, the above and other objects can be accomplished by the provision of a cathode catalyst with a core-shell structure for water electrolysis devices including a transition metal and a transition metal phosphide layer formed on the surface of the transition metal.

In accordance with another aspect of the present invention, provided is a method for preparing a cathode catalyst for water electrolysis devices including mixing a transition metal or transition metal oxide powder with a phosphorous-containing reducing agent powder (A), separately disposing the powder mixture and the phosphorous-containing reducing agent powder (B), and conducting heat-treatment under an inert atmosphere (C).

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
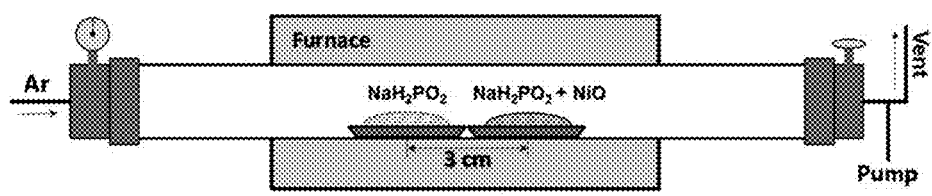
FIG. 1 is an image schematically showing a method for preparing a cathode catalyst for water electrolysis devices according to Example.

Hereinafter, the present invention will be described in more detail with reference to the annexed drawings.

One aspect of the present invention is directed to a cathode catalyst with a core-shell structure for water electrolysis devices including a transition metal and a transition metal phosphide layer formed on the surface of the transition metal.

In one embodiment, in consideration of performance of the catalyst, the transition metal preferably includes one or more selected from the group consisting of nickel, iron, copper, molybdenum and cobalt, but the present invention is not limited thereto.

In another embodiment, the content of phosphorous present on the surface of the transition metal phosphide layer may be 20 wt % or more, based on the total amount (weight) of ingredients constituting the surface of the transition metal phosphide layer.

The content of phosphorous present on the surface of the transition metal phosphide layer may affect the activity of the catalyst. For example, as content of phosphorous increases, activity of the catalyst increases.

In another embodiment, the catalyst may have a mean diameter of 100 nm to 100 μm.

Another aspect of the present invention is directed to a method for preparing a cathode catalyst for water electrolysis devices including mixing a transition metal or transition metal oxide powder with a phosphorous-containing reducing agent powder to obtain a powder mixture (A), separately disposing the powder mixture and the phosphorous-containing reducing agent powder (B), and conducting heat-treatment under an inert atmosphere (C).

The preparation method according to the present invention is characterized in that the phosphorous-containing reducing agent powder is loaded in two locations in an electric furnace or reactor. That is, the phosphorous-containing reducing agent powder mixes with the transition metal oxide and, at the same time, is separately disposed in the reactor to proceed reaction.

In one embodiment, in step (A), a mix ratio (molar ratio) of the transition metal or transition metal oxide powder to the phosphorous-containing reducing agent powder may be 1:0.5 to 1:10.

When the mix ratio (molar ratio) of the transition metal or transition metal oxide powder to the phosphorous-containing reducing agent powder is less than 0.5, the phosphorous-containing reducing agent powder cannot be sufficiently reacted with the transition metal or transition metal oxide due to small amount of phosphorus hydride gas produced by the reducing agent powder separately disposed upstream, and when the mix ratio exceeds 10, the transition metal or transition metal oxide is completely phosphorized, thus inhibiting the effect of the reducing agent powder separately disposed upstream.

In another embodiment, the transition metal oxide powder may include one or more selected from the group consisting of nickel, iron, copper, molybdenum and cobalt.

In another embodiment, the phosphorous-containing reducing agent powder may be sodium hypophosphite powder.

In another embodiment, in step (B), the phosphorous-containing reducing agent powder may be located upstream of the inert gas injected to create the inert atmosphere, compared to the powder mixture.

At this time, the molar ratio of the transition metal or transition metal oxide powder in step (A) to the reducing agent powder separately disposed upstream in step (B) is preferably 1:5 to 1:20. When the molar ratio of the reducing agent powder is less than 5, the surface of the transition metal oxide cannot be sufficiently phosphorized and when the molar ratio exceeds 20, the total of the transition metal is phosphorized, thus making it impossible to form the intended structure.

When the reducing agent powder is disposed upstream of the inert gas, compared to the powder mixture, as described above, a phosphorus hydride gas generated by heating of the reducing agent powder flows along the inert gas and then reacts with transition metal oxide contained in the powder mixture disposed downstream. The phosphorus hydride generated during heating of the phosphorous-containing reducing agent powder reacts with the transition metal oxide to convert the transition metal oxide into transition metal phosphide. In addition, as the phosphorus hydride permeates into transition metal oxide, its amount decreases as reaction proceeds. Accordingly, transition metal containing the highest amount of phosphorous is disposed outermost and contains a lower amount of phosphorus inside.

In a case where a reducing agent powder such as sodium hypophosphite is mixed with transition metal oxide and the resulting mixture is disposed, or these two substances are completely separately disposed, like in a conventional method, the concentration of phosphorus hydride gas reacting with the transition metal oxide and thus the content of the catalyst are as follows: first, 1) when heating temperature reaches about 300° C., the reducing agent powder is decomposed to produce a phosphorus hydride gas and at the same time, the concentration of the phosphorus hydride gas in the reactor rapidly increases. In addition, 2) the produced phosphorus hydride gas reacts with the transition metal oxide and its concentration decreases on a regular basis. In addition, 3) since a part of the phosphorus hydride gas does not react with transition metal oxide and flows along inert gas travelling in the reactor, the concentration of phosphorus hydride gas decreases. In accordance with such a conventional general synthesis method, a catalyst that has a phosphorous content that gradually decreases from the surface to the inside, or a catalyst that has a constant phosphorous content from surface to the inside is obtained.

Meanwhile, according to the method of the present invention, within the reaction time during which the transition metal or transition metal oxide powder reacts with the phosphorus hydride gas generated from the reducing agent powder, with which the transition metal or transition metal oxide powder is mixed, the concentration of phosphorus hydride gas increases due to the phosphorus hydride gas generated from the reducing agent powder separately disposed upstream. At this time, the surface of the transition metal, which has undergone phosphorization to some extent, is phosphorized again, so that a catalyst with a high phosphorous content is synthesized.

That is, a phosphorized transition metal containing a low level of phosphorous is formed by a small amount of reducing agent powder, which is mixed with the transition metal or transition metal oxide powder, and its surface is then re-phosphorized by the reducing agent powder separately disposed upstream, so that a catalyst having a surface with a high phosphorus content is obtained.

Accordingly, unlike phosphide-based catalysts prepared by conventional methods, a catalyst which includes a thin layer containing a high level of phosphorous formed on the surface thereof and in which the level of phosphorus rapidly decreases inwardly may be formed.

In another embodiment, in step (B), the distance between the powder mixture and the phosphorous-containing reducing agent powder is preferably 2 to 10 cm.

When, in step (B), the distance between the powder mixture and the phosphorous-containing reducing agent powder is less than cm, the effect of separately disposing two substances is insufficient, and when the distance exceeds 10 cm, reaction between the phosphorus hydride gas and the transition metal oxide is insufficient due to great distance between the two substances, thus decreasing the effect of increasing the phosphorus content of the produced catalyst surface.

In another embodiment, the heat treatment of step (C) is preferably carried out under an inert atmosphere at a temperature of 200 to 600° C. for 0.5 to 3 hours.

The inert atmosphere may be created by inert gas selected from argon, neon, helium and nitrogen. Disadvantageously, when the reaction temperature is less than 200° C., reaction may not occur, and when the reaction exceeds 600° C., the reactants cause side-reaction. In addition, when the heat treatment time is less than 0.5 hours, heat treatment is insufficient and the effect of increasing the content of phosphorus on the catalyst surface cannot be obtained, and reaction for a period of time longer than hours may be meaningless because phosphorization of the transition metal is finished within 3 hours.

In another embodiment, the heat treatment of step (C) may include two steps. For example, the heat treatment may include a first heat treatment step of heat-treating at 80 to 200° C. for 15 minutes to 2 hours and a second heat treatment step of heat-treating at 250 to 400° C. for 15 minutes to 2 hours. At this time, the first heat treatment step preferably aims to elevate a temperature from room temperature to a range of 80 to 200° C. for 15 minutes to 1 hour and the second heat treatment preferably aims to slowly elevate a temperature from the range of 80 to 200° C. to the range of 250 to 400° C. for 15 minutes to 1 hour. The reason for slowly increasing the temperature during heat treatment is that the temperature distribution can be identical between the transition metal or transition metal oxide powder and the phosphorous-containing reducing agent powder, so that the difference in phosphorization rate resulting from difference in inner temperature between the powders can be minimized, moisture in the powder can be completely evaporated and phosphorization reaction can be effectively performed.

During the first heat treatment, the effect of evaporating moisture in the powder can be obtained, while, during the second heat treatment, uniform phosphorization effect of transition metal can be obtained.

Both the temperature and time of the first heat treatment, and the temperature and time of the second heat treatment should be satisfied, in order to effectively phosphorize the transition metal from the generated phosphorus hydride gas without any influence of water vapor and at the same time, uniformly phosphorize the overall transition metal powder.

In addition, when, during the second heat treatment, the second heat treatment temperature is less than 250° C., sufficient reaction cannot be performed due to slow phosphorization rate of the transition metal, and when the second heat treatment temperature exceeds 400° C., the effect of obtaining transition metal phosphide with a uniform composition cannot be realized due to fast phosphorization rate.

In another embodiment, the inert gas to create the inert atmosphere may be injected at a flow rate of 1 to 3 L/min.

When the flow rate of the inert gas is less than 1 L/min, the effect of separately disposing the phosphorous-containing reducing agent is deteriorated, and when the flow rate exceeds 3 L/min, there may be insufficient time to react the phosphorus hydride gas generated from the separately disposed reducing agent powder with the transition metal or transition metal oxide powder in the powder mixture. Accordingly, the flow rate is preferably maintained within the range defined above.

In another embodiment, after step (C), the product may be subjected to ultrasonication for 2 to 20 minutes so that it can be thoroughly dispersed in distilled water.

In addition, the ultrasonicated product may be filtered and washed to remove impurities. The washed cathode catalyst is preferably dried at 40 to 80° C. for 2 to 5 hours.

The cathode catalyst for water electrolysis devices according to the present invention exhibits high activity due to high content of phosphorous on the catalyst surface, because it undergoes hydrogen generation reaction on the surface thereof, and it can serve as a hydrogen generation catalyst with a high activity, because it exhibits high electrical conductivity due to low content of phosphorous in the catalyst.

Example

Hereinafter, the present invention will be described in more detail with reference to Example and so on, and the scope and contents of the present invention should not be construed as being reduced or limited to the following Example and so on. In addition, it is obvious that the present invention, test results of which are not suggested in detail, can be easily implemented by those skilled in the art, based on the disclosure of the present invention including the following Example.

Example: Preparation of Cathode Catalyst for Water Electrolysis Devices (NiP(P+$P_{up}$))

100 mg of a nickel oxide powder and 1 g of a sodium hypophosphite powder were thoroughly mixed by grinding using a mortar and pestle.

The mixture was homogeneously spread well over an aluminum oxide crucible (width of 10 cm, length of 3 cm, height of 3 cm) and then placed in an electric furnace quartz tube (reactor).

1 g of a sodium hypophosphite powder was charged in the same aluminum oxide crucible as above and placed in an electric furnace quartz tube.

As shown in FIG. 1, the crucible containing only the sodium hypophosphite powder was disposed upstream of inert gas, compared to the crucible containing both the sodium hypophosphite powder and nickel oxide.

In addition, to remove active gas in the electric furnace, the vacuum was maintained using a vacuum pump for about 30 minutes.

In addition, argon gas was flowed into the vacuum quartz tube.

For reaction, the temperature was elevated for 30 minutes from room temperature to 300° C., maintained at 300° C. for 1 hour and was then allowed to cool to room temperature again.

After completion of reaction, the crucible was removed from the electric furnace, and phosphorized nickel, as the resulting product, was ground with a mortar and pestle and then added to distilled water.

The phosphorized nickel was subjected to ultrasonication for 10 minutes to enable the nickel to be thoroughly dispersed in distilled water.

The phosphorized nickel was filtered and, at the same time, washed with 2 L of distilled water.

After completion of washing, the phosphorized nickel was dried at 60° C. for 3 hours or longer.

Comparative Example: Preparation of Cathode Catalyst for Water Electrolysis Devices (NiP(2P))

Figure 2:
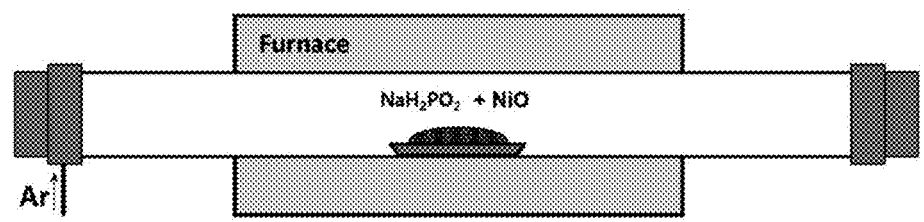
FIG. 2 is an image schematically showing a method for preparing a cathode catalyst for water electrolysis devices according to Comparative Example.

100 mg of a nickel oxide powder and 2 g of a sodium hypophosphite powder were thoroughly mixed by grinding using a mortar and pestle. As shown in FIG. 2, the resulting mixture was thoroughly spread well over aluminum oxide crucible (width of 10 cm, length of 3 cm, height of 3 cm) and then placed in an electric furnace quartz tube (reactor). Then, a cathode catalyst for water electrolysis devices (NiP(2P)) was prepared in the same manner as in Example.

TEST EXAMPLE

Test Example 1: Assay of Content of Phosphorous (P) in Cathode Catalyst for Water Electrolysis Devices EDS analysis was carried out using a TENEO VS apparatus and results are shown as a graph in FIG. 3.

Figure 3:
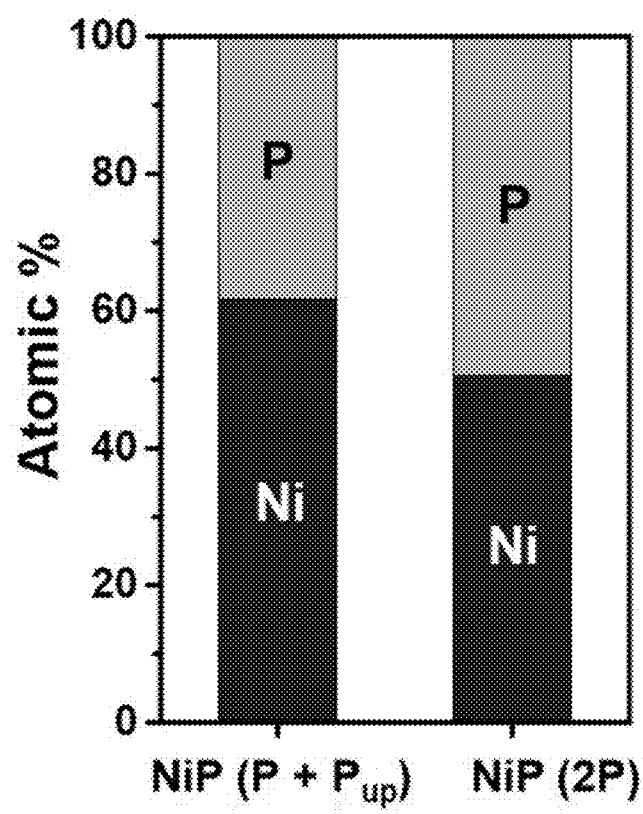
FIG. 3 is an image showing EDS analysis results of the cathode catalysts for water electrolysis devices manufactured in Example and Comparative Example.

As can be seen from FIG. 3, NiP(P+P$_{up}$) of Example contains about 40% of phosphorus in total, while NiP(2P) of Comparative Example contains about 50% of phosphorus in total. Although sodium hypophosphite is used in the equal amounts in Example and Comparative Example, in the case of Comparative Example wherein the total amount of sodium hypophosphite is mixed with nickel oxide and reaction proceeds, a greater amount of phosphorus is contained in the phosphorized nickel catalyst.

In addition, in order to characterize properties of NiP(P+P$_{up}$) of Example and NiP(2P) of Comparative Example in more detail, XPS and SEM-EDS analysis were performed. SEM-EDS (scanning electron spectroscopy and energy dispersive X-ray spectroscopy) was carried out by element assay using JEOL (JSM-6390A). Assay results are shown in the following Table 1.

TABLE 1

| Catalyst | Content of phosphorus in catalyst (wt %) - SEM-EDS | Content of phosphorus on catalyst surface (wt %) - XPS |
|---|---|---|
| Example (NiP(P + P$_{up}$)) | 15.3 | 51.3 |
| Comparative Example (NiP(2P)) | 20.9 | 29.7 |

* Content of phosphorus in catalyst is based on the total weight of ingredients in catalyst, which is measured after removal of catalyst surface by plasma etching.
* Content of phosphorus on catalyst surface is based on the total weight of ingredients of catalyst surface Test Example 2: Phase Analysis of Cathode Catalyst for Water Electrolysis Devices XRD analysis was carried out using Dmax2500/PC, an X-ray light source was operated at 60 kV and 300 mA, and a Cu k-alpha light source was used. Analysis was carried out at 20 to 90 degrees) (°) at a scanning rate of 2°/min at room temperature.

Figure 4:
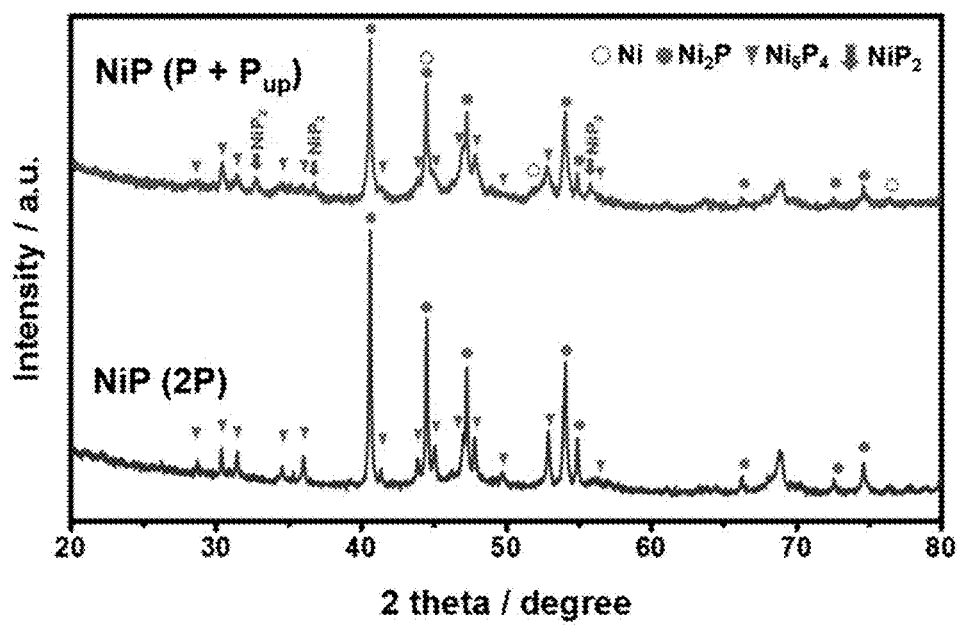
FIG. 4 is a graph showing X-ray diffraction (XRD) analysis results of the cathode catalysts for water electrolysis devices manufactured in Example and Comparative Example.

The results obtained by the analysis process are shown in FIG. 4. As can be seen from FIG. 4, NiP(2P) of Comparative Example consists of a great amount of Ni$_2$P and a small amount of Ni$_5$P$_4$, while NiP(P+P$_{up}$) of Example consists of a great amount of Ni$_2$P and a small amount of Ni, Ni$_5$P$_4$ and NiP$_2$.

Test Example 3: Analysis of Electrical Conductivity of Cathode Catalyst for Water Electrolysis Devices In order to measure electrical conductivity of cathode catalysts for water electrolysis devices, electrical conductivity was measured at a predetermined pressure using four probes with a resistance measurement device and a potentiometer circuit. Specifically, the cathode catalysts for water electrolysis devices according to Example and Comparative Example were manufactured in the form of a pellet with a diameter of 1 cm and electrical conductivity thereof was measured. At this time, the thickness of the pellet was measured using Vernier calipers.

Figure 5:
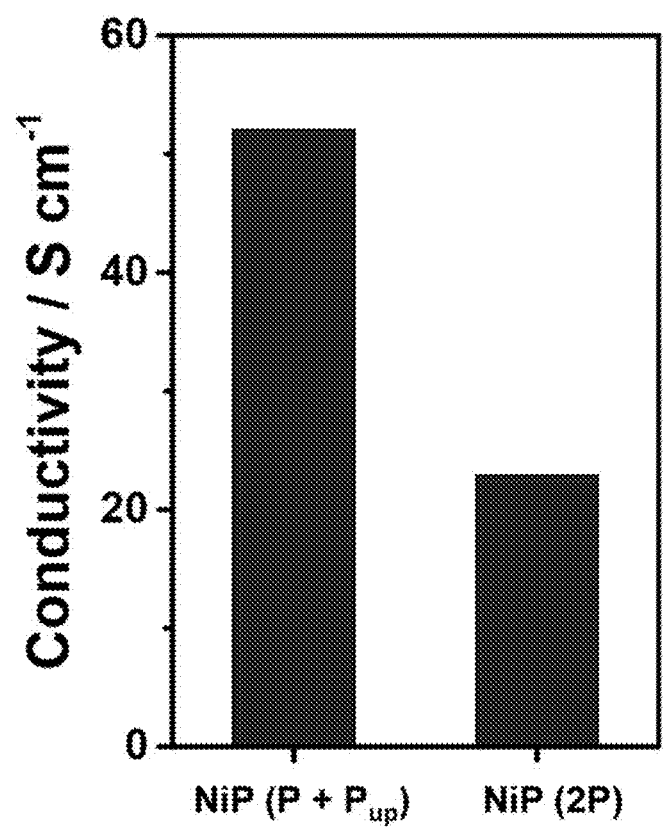
FIG. 5 is a graph showing electrical conductivity measurement results of the cathode catalysts for water electrolysis devices manufactured in Example and Comparative Example.

FIG. 5 is a graph showing electrical conductivity of cathode catalysts for water electrolysis devices in Example and Comparative Example according to the present invention.

As can be seen from FIG. 5, NiP(P+P$_{up}$) of Example has an about 2-times higher electrical conductivity than NiP(2P) of Comparative Example.

Test Example 4: Structure of Cathode Catalysts for Water Electrolysis Devices

Respective structures of cathode catalysts for water electrolysis devices of Example and Comparative Example were confirmed through the analysis processes.

Figure 6A:
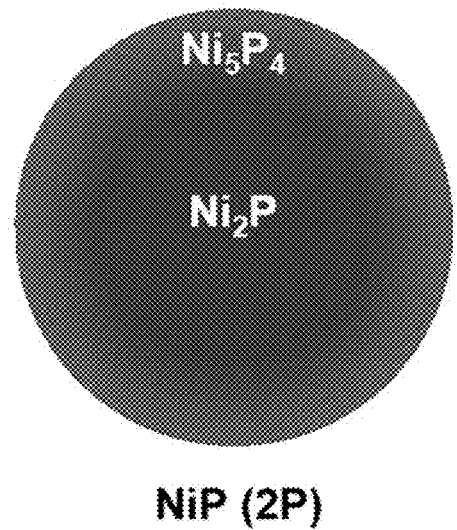
FIG. 6A is a schematic view showing the inner structure of the cathode catalyst for water electrolysis devices manufactured in Comparative Example and FIG. 6B is a schematic view showing the inner structure of the cathode catalyst for water electrolysis devices manufactured in Example.
Figure 6B:
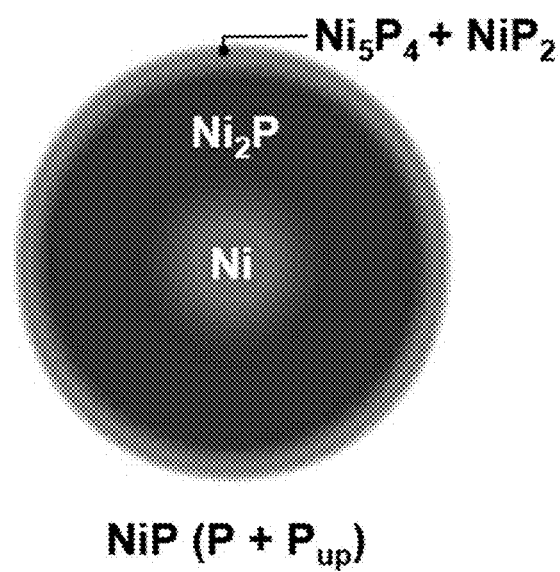

FIGS. 6A and 6B are schematic views illustrating structures of cathode catalysts for water electrolysis devices according to Example and Comparative Example of the present invention.

As can be seen from FIGS. 6A and 6B, the NiP(2P) of Comparative Example includes a relatively thin Ni$_5$P$_4$ layer on the surface thereof and includes Ni$_2$P therein. On the other hand, NiP(P+P$_{up}$) of Example includes a relatively thin NiP$_2$ layer on the surface thereof and includes Ni$_5$P$_4$, Ni$_2$P, and Ni disposed in this order inwardly, and among them, the amount of Ni$_2$P is the highest and thus forms the thickest layer.

Test Example 5: Measurement of Electrochemical Properties of Cathode Catalysts for Water Electrolysis Devices In order to evaluate electrochemical properties of cathode catalysts for water electrolysis devices, electrochemical tests for generating hydrogen were conducted. The electrochemical tests were carried out using a three-electrode system including a working electrode, a standard electrode and a counter electrode.

Specifically, AUTOLAB potentiostate (PGSTAT302N, Eco Chemice) was used and 10 mg of each catalyst obtained in Example and Comparative Example, 60 μl of a Nafion solution (5 wt %, Sigma-Aldrich), and 800 μl of isopropyl alcohol were dispersed by ultrasonication in a 20 ml vial for about 10 minutes to prepare a catalyst ink. 5 μl of the catalyst ink was dried on the RDE electrode, which was used as the working electrode.

A carbon rod was used as the counter electrode, SCE (saturated calomel electrode) was used as the standard electrode and an argon-saturated 0.5M sulfuric acid solution was used as an electrolyte.

The overall electrochemical analysis was carried out at room temperature and the RDE electrode was rotated at a rate of 2,500 rpm in order to rapidly separate hydrogen gas generated during analysis from the electrode.

The electrode scanning range was 0V to −0.3V vs RHE and the scanning rate was 5 mV/s.

Figure 7:
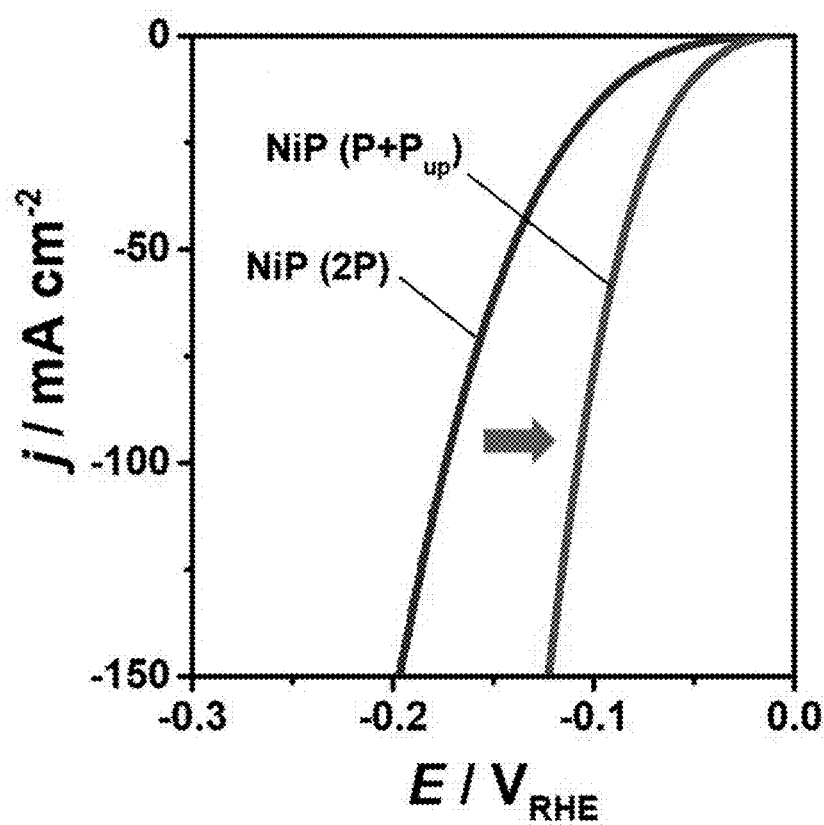
FIG. 7 is a graph showing analysis results of electrochemical hydrogen generation reaction activity of cathode catalysts for water electrolysis devices manufactured in Example and Comparative Example.

FIG. 7 is a graph showing analysis results of electrochemical hydrogen generation reaction activity of cathode catalysts for water electrolysis devices according to Example and Comparative Example of the present invention.

When comparing activity to hydrogen generation reaction, with reference to FIG. 7, $NiP(P+P_{up})$ of Example has higher reduction current than NiP(2P) of Comparative Example and thus higher hydrogen generation activity.

As apparent from the foregoing, with regard to the catalyst prepared in accordance with the present invention, the content of phosphorous on the catalyst surface is high, while the content of phosphorous in the catalyst is low. As a result, both activity to hydrogen generation reaction and electrical conductivity are improved, compared to conventional catalysts.

Since the surface of the cathode catalyst for water electrolysis devices according to the present invention has a high phosphorous content, activity to hydrogen generation reaction is improved, while, since the inner area of the catalyst has a low phosphorous content, high electrical conductivity can be maintained. That is, the cathode catalysts for water electrolysis devices according to the present invention can exhibit both high activity and high electrical conductivity.

It is obvious to those skilled in the art in the field to which the present invention pertains that the present invention can be implemented in the form of aforementioned embodiments as well as other embodiments, based on technical knowledge at a filing time of the present invention and the present disclosure, without changing the technical concepts and indispensable features of the present invention.

The scope of the present invention is defined not by the Detailed Description of the Invention, but by the claims described later and it should be construed that all modifications or alterations derived from the meanings and scope of the claims and equivalent concepts thereto fall within the scope of the present invention.

What is claimed is:

1. A method for preparing a cathode catalyst for water electrolysis devices comprising:
    mixing a transition metal or transition metal oxide powder with a phosphorous-containing reducing agent powder to obtain a powder mixture (A);
    separately disposing the powder mixture and the phosphorous-containing reducing agent powder in a reactor (B); and
    conducting heat-treatment under an inert atmosphere (C).

2. The method according to claim 1, wherein, in step (A), a mix ratio (molar ratio) of the transition metal or transition metal oxide to the phosphorous-containing reducing agent is 1:0.5 to 1:10.

3. The method according to claim 1, wherein the transition metal comprises one selected from the group consisting of nickel, iron, copper, molybdenum and cobalt.

4. The method according to claim 1, wherein the phosphorous-containing reducing agent powder is a sodium hypophosphite powder.

5. The method according to claim 1, wherein, in step (B), the phosphorous-containing reducing agent powder is disposed upstream of the inert gas injected to create an inert atmosphere, compared to the powder mixture.

6. The method according to claim 1, wherein, in step (B), the distance between the powder mixture and the phosphorous-containing reducing agent powder is 2 to 10 cm.

7. The method according to claim 1, wherein a ratio of the transition metal or transition metal oxide powder of step (A) to the phosphorous-containing reducing agent powder of step (B) is 1:5 to 1:20.

8. The method according to claim 1, wherein, in step (C), the heat treatment is carried out at a temperature of 200 to 600° C. for 0.5 to 3 hours.

9. The method according to claim 1, wherein, in step (C), the heat treatment comprises:
    a first heat treatment step of heat-treating at 80 to 200° C. for 15 minutes to 2 hours; and
    a second heat treatment step of heat-treating at 250 to 400° C. for 15 minutes to 2 hours.

10. The method according to claim 1, wherein the inert atmosphere is created by an inert gas selected from argon, neon, helium and nitrogen.

11. The method according to claim 1, wherein the inert gas to create the inert atmosphere is injected at a flow rate of 1 to 3 L/min.

12. The method according to claim 1, further comprising subjecting the product to ultrasonication in distilled water for 2 to 20 minutes after step (C).

* * * * *